(12) United States Patent
Pontes

(10) Patent No.: US 9,859,613 B2
(45) Date of Patent: Jan. 2, 2018

(54) RADAR SENSOR INCLUDING A RADOME

(71) Applicant: Robert Bosch GmbH, Stuttgart (DE)

(72) Inventor: Juan Pontes, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 333 days.

(21) Appl. No.: 14/508,484

(22) Filed: Oct. 7, 2014

(65) Prior Publication Data

US 2015/0097730 A1    Apr. 9, 2015

(30) Foreign Application Priority Data

Oct. 8, 2013 (DE) .................. 10 2013 220 259

(51) Int. Cl.
| | | |
|---|---|---|
| *H01Q 1/42* | (2006.01) | |
| *H01Q 1/40* | (2006.01) | |
| *G01S 13/02* | (2006.01) | |
| *G01S 7/03* | (2006.01) | |
| *G01S 13/93* | (2006.01) | |
| *G01S 7/02* | (2006.01) | |
| *H01Q 1/32* | (2006.01) | |

(52) U.S. Cl.
CPC .............. *H01Q 1/42* (2013.01); *G01S 7/032* (2013.01); *G01S 13/02* (2013.01); *G01S 13/931* (2013.01); *H01Q 1/40* (2013.01); *G01S 7/02* (2013.01); *G01S 2007/027* (2013.01); *G01S 2013/9389* (2013.01); *H01Q 1/3233* (2013.01)

(58) Field of Classification Search
CPC .... H01Q 1/42; H01Q 1/40; G01S 7/02; G01S 7/032; G01S 13/02

USPC .................................. 342/385; 343/872, 713
See application file for complete search history.

(56) References Cited

U.S. PATENT DOCUMENTS

| | | | | |
|---|---|---|---|---|
| 2,959,671 A * | 11/1960 | Stevinson | ............... | B64D 25/20 244/1 R |
| 6,489,927 B2 * | 12/2002 | LeBlanc | ............ | B60K 31/0008 342/198 |
| 6,496,138 B1 * | 12/2002 | Honma | .................. | G01S 13/931 342/27 |
| 6,744,399 B2 * | 6/2004 | Tohyama | ............... | G01S 7/4026 342/165 |
| 6,897,819 B2 * | 5/2005 | Henderson | ........... | H01Q 1/3233 342/70 |
| 7,068,211 B2 * | 6/2006 | Oswald | .................. | G01S 13/931 342/27 |
| 7,295,166 B2 * | 11/2007 | Fujii | .................... | B29C 45/1671 343/700 MS |
| 7,482,990 B2 * | 1/2009 | Fujii | ..................... | H01Q 1/3233 343/713 |
| 7,508,353 B2 * | 3/2009 | Shingyoji | ............ | H01Q 1/3233 342/1 |
| 7,705,771 B2 * | 4/2010 | Kato | ......................... | G01S 7/35 342/175 |

(Continued)

*Primary Examiner* — Chuong P Nguyen
(74) *Attorney, Agent, or Firm* — Norton Rose Fulbright US LLP; Gerard Messina

(57) ABSTRACT

A radar sensor for motor vehicles includes a printed circuit board which carries the mass and antenna structures of the radar sensor, and includes a housing accommodating the printed circuit board, the housing being formed on a transmit and receive side of the radar sensor by a radome which is transparent to radar radiation, characterized in that the radome has an essentially plane wall oriented obliquely to the printed circuit board.

10 Claims, 2 Drawing Sheets

(56) References Cited

U.S. PATENT DOCUMENTS

| | | | | |
|---|---|---|---|---|
| 7,710,312 B2* | 5/2010 | Kato | ............... | G01S 7/034 |
| | | | | 342/175 |
| 7,724,180 B2* | 5/2010 | Yonak | ............... | G01S 13/931 |
| | | | | 342/70 |
| 8,974,712 B2* | 3/2015 | Ohtake | ............... | H01Q 1/42 |
| | | | | 264/255 |
| 2004/0227663 A1* | 11/2004 | Suzuki | ............... | G01S 7/03 |
| | | | | 342/70 |
| 2012/0212364 A1* | 8/2012 | Takeuchi | ............... | G01S 7/03 |
| | | | | 342/70 |
| 2014/0091969 A1* | 4/2014 | Shi | ............... | G01S 13/931 |
| | | | | 342/385 |
| 2015/0084803 A1* | 3/2015 | Purden | ............... | H01Q 1/3283 |
| | | | | 342/1 |
| 2015/0123872 A1* | 5/2015 | Fujita | ............... | G01S 13/931 |
| | | | | 343/872 |
| 2015/0207217 A1* | 7/2015 | Fujita | ............... | H01Q 1/3233 |
| | | | | 343/872 |
| 2015/0378006 A1* | 12/2015 | Ishida | ............... | G01S 7/038 |
| | | | | 342/175 |
| 2016/0231417 A1* | 8/2016 | Aoki | ............... | G01S 13/931 |
| 2017/0222311 A1* | 8/2017 | Hess | ............... | H01Q 1/42 |
| | | | | 343/872 |

* cited by examiner

RADAR SENSOR INCLUDING A RADOME

RELATED APPLICATION INFORMATION

The present application claims priority to and the benefit of German patent application no. 10 2013 220 259.8, which was filed in Germany on Oct. 8, 2013, the disclosure of which is incorporated herein by reference.

FIELD OF THE INVENTION

The present invention relates to a radar sensor for motor vehicles, including a printed circuit board which carries the mass and antenna structures of the radar sensor, and including a housing accommodating the printed circuit board, the housing being formed on a transmit and receive side of the radar sensor by a radome which is transparent to radar radiation. The object of the present invention is moreover a motor vehicle having such a radar sensor.

BACKGROUND INFORMATION

Radar sensors are used in motor vehicles, for example, for measuring the distances and relative velocities of preceding vehicles, so that, for example, a collision warning and/or an automatic distance regulation is made possible. In the case of these applications, the radar sensor is installed in the front area of the vehicle body. The radome has the purpose of protecting the sensitive electronic components of the radar sensor against mechanical impact and weather conditions. In several known radar sensors, the radome is formed as a radar lens, which is used to simultaneously achieve collimation and beam forming of the radar beam. In the case of other known radar sensors the beam forming is solely carried out by the geometry and activation of the antenna elements, for example, according to the principle of a phased array antenna. In this case, the radome may be formed simply by a plane wall made of plastic.

Since the bumpers of vehicles today are usually made of plastic and are consequently transparent to radar radiation, it is frequently desired to install the radar sensor protected and concealed behind the vehicle's bumper. However, a problem exists that while the bumper made of plastic is largely transparent to the radar radiation, it does have a certain reflective capacity. Since, on the other hand, the incoming radar waves are also reflected on the mass structures of the printed circuit board after having passed through the bumper, multiple reflections may occur between the printed circuit board and the vehicle's bumper. These multiple reflections represent an undesirable interfering signal when the radar signal is evaluated.

Such multiple reflections are particularly interfering in the case of angle-resolving radar sensors, in which multiple antenna elements are situated side by side across the width of the vehicle, so that it is possible to measure or at least estimate the azimuth angle of the located object by evaluating the amplitude and phase relations between the radar echoes received by the different antenna elements. The multiple reflections may falsify the amplitudes and phases so severely that the accuracy of the angle measurement is considerably adversely affected.

A possible countermeasure is to tilt the bumper in such a way that its reflective surface is no longer parallel to the plane of the printed circuit board and consequently the radar waves no longer strike the antenna structures after one or repeated reflections. However, such a tilt of the bumper limits the constructional flexibility in designing the bumper and in installing the radar sensor.

SUMMARY OF THE INVENTION

An object of the present invention is to provide a radar sensor, which is less sensitive to multiple reflections on the vehicle's bumper.

According to the present invention, this objective is achieved in that the radome has an essentially plane wall oriented obliquely to the printed circuit board.

Before reaching the printed circuit board, the incoming radar waves, which have passed through the vehicle's bumper, must also pass through the radome, a small component of the radiation energy being reflected. After being reflected on the printed circuit board, the radar waves are again reflected on the radome. Due to the oblique position of the radome, the reflected waves are deflected at an angle which is double the angle between the plane of the radome and the plane of the printed circuit board. An adequate oblique position of the radome makes it possible to achieve that the reflected waves no longer strike the antenna structures as early as after the first reflection, but no later than after the second or third reflection.

A certain component of the waves that return from the printed circuit board to the radome pass through the radome and are again reflected on the bumper. A certain component of these waves are again reflected and deflected when they again pass through the radome. Due to the additional reflection losses on the radome, the multiple reflections between the printed circuit board and the bumper are generally significantly more severely attenuated than in the case of a radar sensor whose radome is oriented in parallel to the printed circuit board. This makes it possible to obtain a relatively interference-free signal even when the bumper is not tilted or is tilted only slightly.

Advantageous refinements and embodiments of the present invention are described herein.

Exemplary embodiments are explained in greater detail below with reference to the drawings.

DETAILED DESCRIPTION

Figure 1:
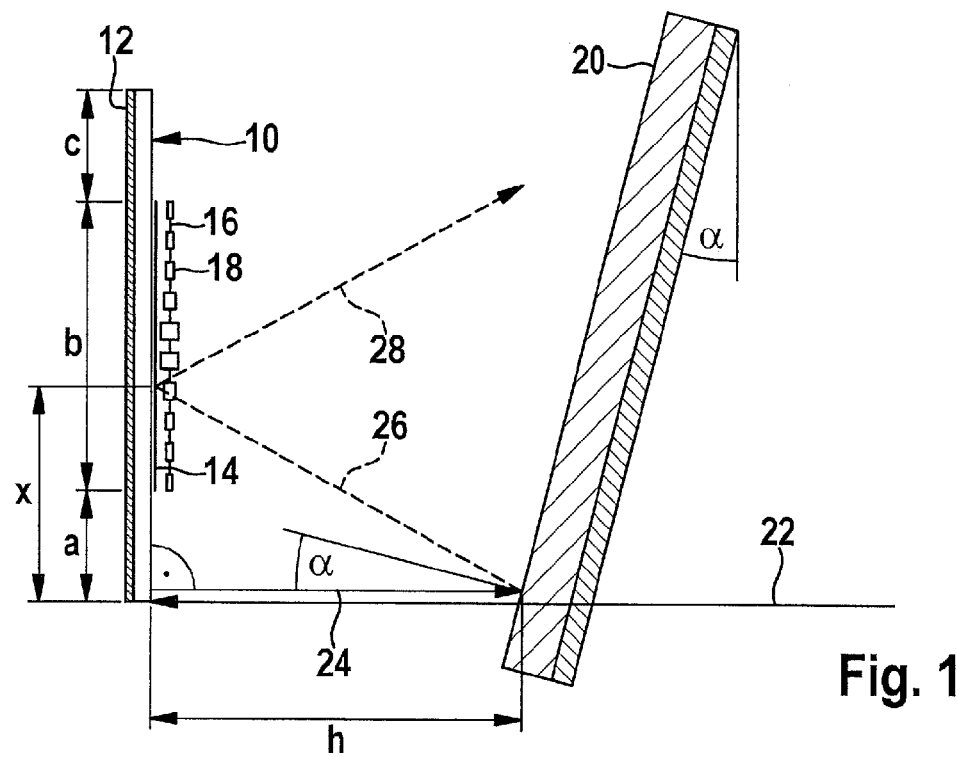
FIG. 1 shows a schematic diagram of a radar sensor without a radome, which is installed behind a tilted bumper.

A side view of a printed circuit board 10 in the form of a plane plate of a radar sensor of a motor vehicle is shown schematically in FIG. 1, the printed circuit board being mounted in a vertical orientation in the front area of the motor vehicle, which is not shown. Printed circuit board 10 carries mass structures 12, which in the example shown have the form of a metallization on the rear side of the printed circuit board. Furthermore, on its front side, printed circuit board 10 carries antenna structures 14, for example, in the form of multiple vertical gaps 16 of antenna elements 18. A single one of these gaps 16 is shown schematically also in layout in FIG. 1.

Antenna elements 18 of each gap are connected in series to a high-frequency signal of an oscillator, which is not shown. The dimensions of antenna elements 18 and the distances between them are selected in such a way that the resonance vibrations excited in individual antenna elements 18 have phase and amplitude relationships, which result in a certain beam forming in elevation, more precisely, a bundling of the emitted radar radiation forward in the direction of travel of the motor vehicle (to the right in FIG. 1) in the case of a front radar.

As an example, it should be assumed that the radar sensor is a sensor including a monostatic antenna system. This means that antenna elements 18 which are used for emitting the radar signal are also used for receiving the radar echoes reflected by the located objects. The received radar echoes are evaluated separately in a known manner for each gap 16.

If a radar echo arrives from an object whose line of sight is not exactly oriented at a right angle to the plane of printed circuit board 10, i.e., from an object having an azimuth angle different from 0°, due to the different signal propagation delays, this results in characteristic amplitude and phase differences between the signals which are received in the different antenna gaps situated at a distance from one another in the transverse direction of the vehicle. Based on these characteristic differences, it is possible to determine the azimuth angle of the located object, at least approximately.

In the example shown in FIG. 1, the radar sensor is installed concealed behind a bumper 20 of the motor vehicle. Of bumper 20, only a certain section of a wall of the bumper is shown schematically in cross section in FIG. 1. This wall of the bumper is formed by one or multiple layers of plastic materials and in the example shown, it is tilted about a certain angle α in relation to the vertical and consequently also in relation to the plane of printed circuit board 10.

In FIG. 1, an incoming radar beam 22 is shown schematically, which (after reflection on an object which is not shown) passes through bumper 20 and strikes the outermost lower edge of printed circuit board 10. The angle of elevation of radar beam 22 amounts to 0°, i.e., the beam strikes printed circuit board 10 in elevation at a right angle. Radar beam 22 is nearly completely reflected on printed circuit board 10, in particular on its mass structures 12, so that a reflected beam 24 returns to bumper 20 and strikes the inner surface of bumper 20 under an angle of incidence α, which is equal to the tilt of the bumper. A certain component of the radiation is again reflected here and forms a multiply reflected first-order beam 26, which again strikes printed circuit board 10 at a certain vertical offset x. Here the beam must be reflected again, so that a reflected second-order beam 28 returns again to bumper 20. This process may in principle be repeated multiple times, so that a cascade of multiple reflections is obtained, the intensity of which, however, decays exponentially due to losses occurring in each reflection.

When the multiply reflected first-order and higher order beams strike in the zone on printed circuit board 10, in which gaps 16 of antenna elements 18 are located, the multiply reflected beams are received by the antenna elements, and they form an interference signal which falsifies the amplitude and phase relations between the signals received in different gaps 16 and thus makes it more difficult to measure the azimuth angle.

In the example shown in FIG. 1, the tilt of bumper 20 about angle α has the result that only multiply reflected first order beam 26 strikes antenna structures 14, while multiply reflected second-order and higher order beams are already deflected far enough upwards that they no longer strike the antenna structures.

When bumper 20 is tilted about a larger angle α, this makes it possible for multiply reflected first-order beam 26 to also no longer strike antenna structures 14 (not even when incoming beam 22 strikes printed circuit board 10 on its outermost lower edge as in FIG. 1).

In FIG. 1, "a" denotes the vertical distance between the lower edge of printed circuit board 10 and the lower edge of antenna structures 14, "b" denotes the height of antenna structures 14, and "c" indicates the distance between the upper edge of antenna structures 14 and the upper edge of printed circuit board 10. The condition that multiply reflected first-order beam 26 should also not strike antenna structures 14, may then be expressed as inequality $$x > a + b \tag{1}$$

Incoming beam 22, multiply reflected beam 26 and the section of printed circuit board 10 which has the height x form a right triangle. Based on the law of reflection (angle of incidence equals angle of reflection), the angle which is diametrically opposed to the side of the triangle having length x has the value 2α. Therefore:

$$\tan(2\alpha) = x/h \tag{2}$$

h being the distance between printed circuit board 10 and bumper 20 at the height of incoming beam 22.

Based on these relationships, it is possible to determine angle α on which bumper 20 should at least be tilted in order to avoid interfering multiple reflections. In practical specific embodiments, angle α amounts to at least 18° or more. However, there are installation situations and vehicle designs in which such a large tilt angle of the bumper is undesired.

Figure 2:
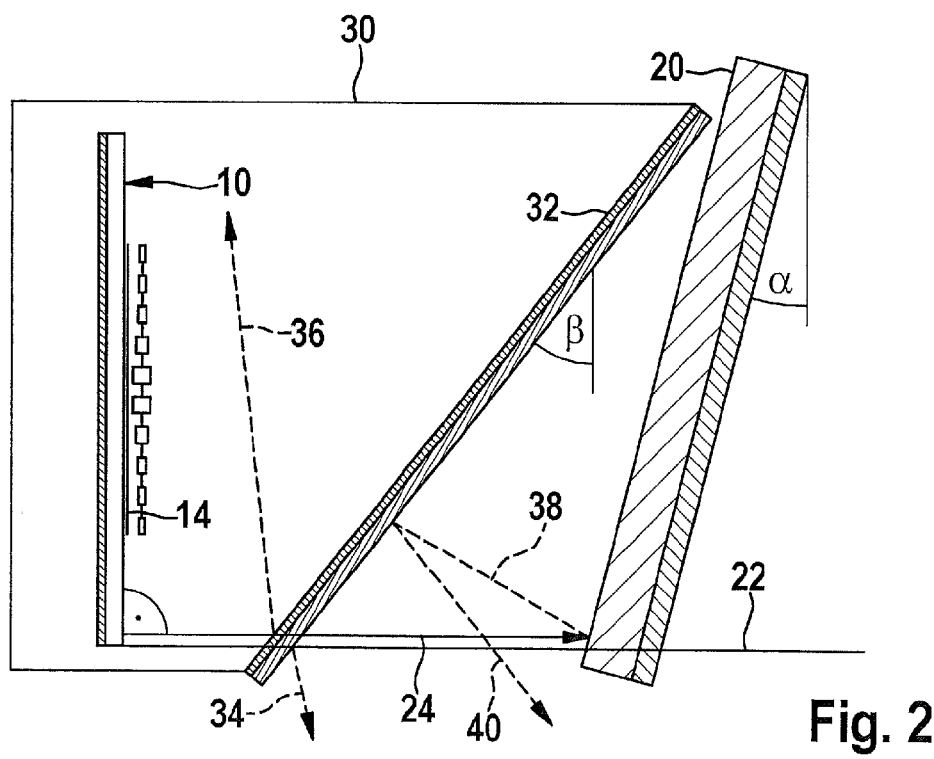
FIG. 2 shows a similar schematic diagram for a radar sensor including a radome according to the present invention.

In a diagram similar to FIG. 1, FIG. 2 illustrates a radar sensor according to the present invention in which the interfering multiple reflections may be largely suppressed independently of the tilt angle of the bumper.

In the case of this radar sensor, printed circuit board 10 is (as is customary per se) accommodated in a protective housing 30, which is limited on the side toward which the radar radiation is emitted by a wall made of plastic, which is transparent to radar radiation, a so-called radome 32. The particularity in this case is that radome 32 is tilted in relation to printed circuit board 10 about a certain angle β.

Incoming beam 22 must now not only pass through bumper 20 but also radome 32, a certain reflection loss again occurring (beam 34), which, however, does not significantly reduce the sensitivity of the radar sensor.

Reflected beam 24 must also pass through radome 32, with the consequence that a certain radiation component (beam 36) is already reflected on the radome. In the example shown, angle β is selected in such a way that multiply reflected first-order beam 36 does not strike antenna structures 14. Angle β of the tilt of the radome required for this may be calculated using equations (1) and (2) provided above for angle α, by substituting β for α and the distance between printed circuit board 10 and radome 32 for h.

The larger share of reflected beam 24 will pass through radome 32 and strike bumper 20, resulting in another multiply reflected beam 38. In the case of unhindered propagation, this beam 38 could strike antenna structures 14; however, it must again pass through radome 32, a certain component of the radiation again being reflected (beam 40). Reflected beam 40 is in this case directed away from antenna structures 14. The component of multiply reflected first order beam 38, which ultimately strikes the antenna structures, is for that reason significantly attenuated by two additional reflections on radome 32 in addition to the reflection on bumper 20, so that the useful signal is less falsified and interfered with. In the case of multiple higher order reflections, the additional reflection losses result in a significantly faster decay of the beam intensity, so that the interfering influence of the multiple reflections may ultimately be effectively suppressed even when angle α, about which bumper 20 is tilted, is relatively small or even 0°.

The effect of radome 32 may, if necessary, be increased in that the rear side of radome 32, which faces printed circuit board 10, is "mirrored" by a suitable coating, so that it has a particularly high reflective capacity for the radar radiation having the frequency of the radar sensor and having angle of incidence β, and consequently the intensity of reflected beam 36 is increased at the expense of beam 24 which has passed through.

Figure 3:
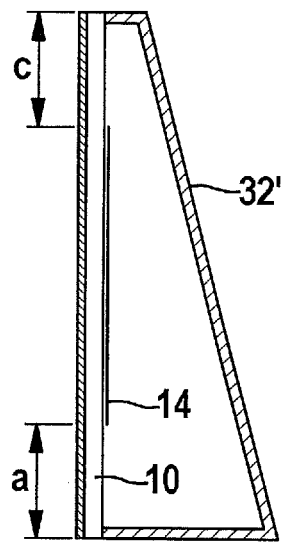
FIG. 3 shows an additional exemplary embodiment which differs in the geometry of the radome.

While in the example shown in FIG. 2, radome 32 is tilted in such a way that its lower edge is closer to printed circuit board 10 than its upper edge, specific embodiments are of course also possible in which radome 32 is tilted in the opposite direction. For determining angle β, in which multiply reflected first-order beam 36 no longer strikes antenna structures 14, variable "c" must be substituted for variable "a" in above inequality (1). A radome 32' configured in this way is shown in FIG. 3.

Figure 4:
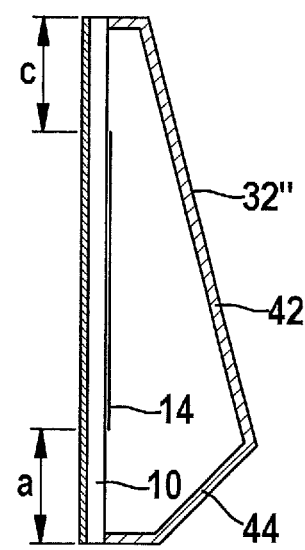
FIG. 4 shows an additional exemplary embodiment which differs in the geometry of the radome.

Optionally, the radar sensor may also have a roof-shaped radome 32", as shown in FIG. 4. This radome has two asymmetric roof surfaces 42, 44. Such a system may, for example, be advantageous when antenna structures 14 on printed circuit board 10 are also situated asymmetrically with regard to the edges of the printed circuit board (a≠c).

Figure 5:
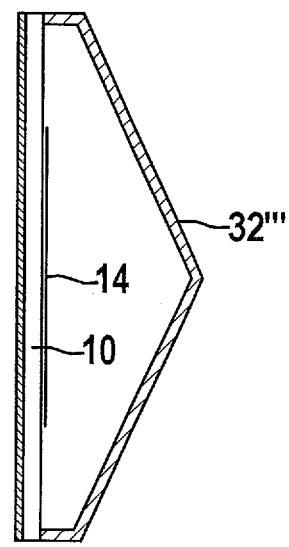
FIG. 5 shows an additional exemplary embodiment which differs in the geometry of the radome.

As another example, FIG. 5 finally shows a radome 32''' having a symmetrical roof form. This system is advantageous in particular when the bumper has only a relatively small tilt or no tilt, and makes it possible to reduce the overall height of the radome, so that the distance between the radar sensor and bumper 20 may also be correspondingly short.

What is claimed is:

1. A motor vehicle, comprising:
  a bumper; and
  a radar sensor arranged behind the bumper;
  wherein:
    the radar sensor includes a mass, antenna structures, a printed circuit board that carries the mass and antenna structures, and a housing accommodating the printed circuit board and including a radome at a transmit and receive side of the radar sensor;
    the radome is transparent to radar radiation, includes a wall that is essentially a plane oriented obliquely to a plane formed by the printed circuit board, and is positioned between the antenna structures and the bumper; and
    the antenna structures are arranged and configured to detect radar beams including a radar beam that passes through the bumper and is incident on the antenna structures in a direction that is perpendicular to the plane of the printed circuit board.

2. The motor vehicle of claim 1, wherein the wall of the radome forms an angle with the printed circuit board which results in that, for all beams that are incident on the printed circuit board and are reflected from the printed circuit board back towards the radome, a respective associated multiply reflected first-order beam, that is formed by reflection by the radome of the beam reflected to the radome from the printed circuit board, travels away from the radome in a direction such that it no longer strikes the antenna structures on the printed circuit board.

3. The motor vehicle of claim 1, wherein the plane of the printed circuit board extends in vertically and the oblique orientation of the radome relative to the plane of the printed circuit board forms an angle with the vertical extension of the plane of the printed circuit board.

4. The motor vehicle of claim 3, wherein the antenna structures include a plurality of antenna elements that are separated from each other by respective gaps, and wherein the gaps are vertically oriented and situated next to one another.

5. The motor vehicle of claim 1, wherein the radome forms a panel-shaped roof of the housing.

6. The motor vehicle of claim 1, wherein the radome forms a pointed roof of the housing.

7. The motor vehicle of claim 6, wherein the radome forms a symmetrical pointed roof.

8. The motor vehicle of claim 1, wherein the radar sensor is installed behind a wall of the bumper that is tilted in relation to the plane of the printed circuit board of the radar sensor by less than 15°.

9. The motor vehicle of claim 1, wherein the radome includes, on a side of the radome facing towards the printed circuit board and away from the bumper, a coating that is highly reflective for the radar beams, so that the side of the radome facing towards the printed circuit board and away from the bumper is more reflective for the radar beams than an opposite side of the radome that faces away from the printed circuit board and towards the bumper.

10. The motor vehicle of claim 1, wherein the bumper, at a region of the bumper that is in at least one plane that passes perpendicularly through the printed circuit board, is oriented obliquely to the plane of the printed circuit board.

* * * * *